(No Model.) 8 Sheets—Sheet 1.
H. GUILLAUME.
SLEEPING CAR.
No. 331,233. Patented Nov. 24, 1885.
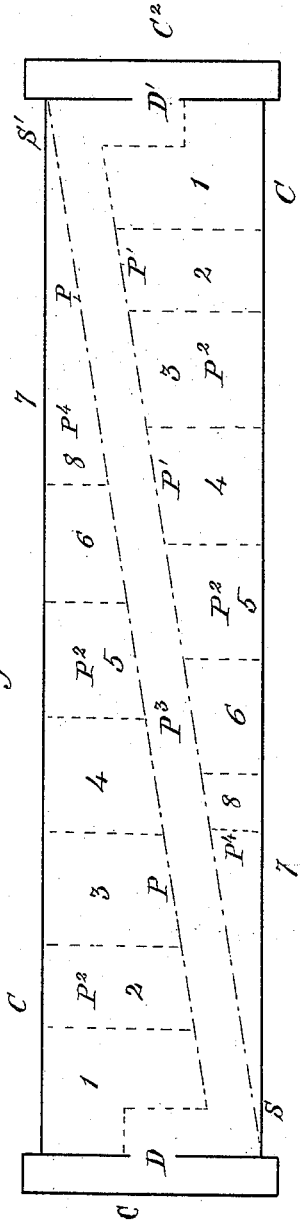
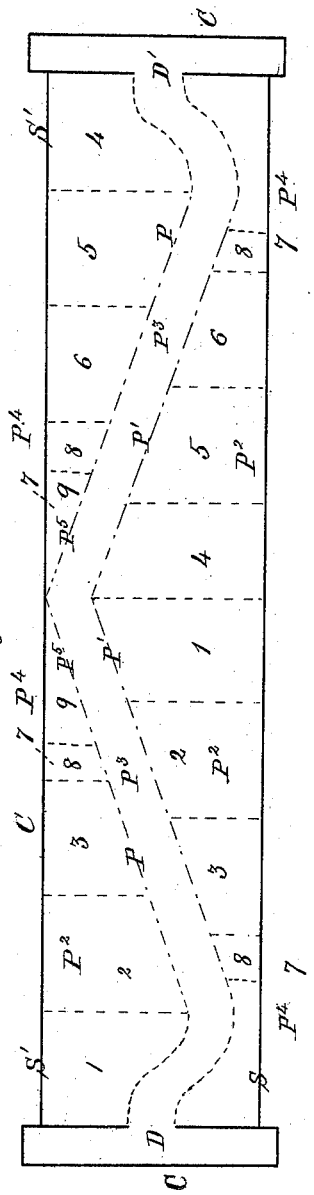
Witnesses
Inventor
Henri Guillaume (No Model.) 8 Sheets—Sheet 2.
H. GUILLAUME.
SLEEPING CAR.
No. 331,233. Patented Nov. 24, 1885.
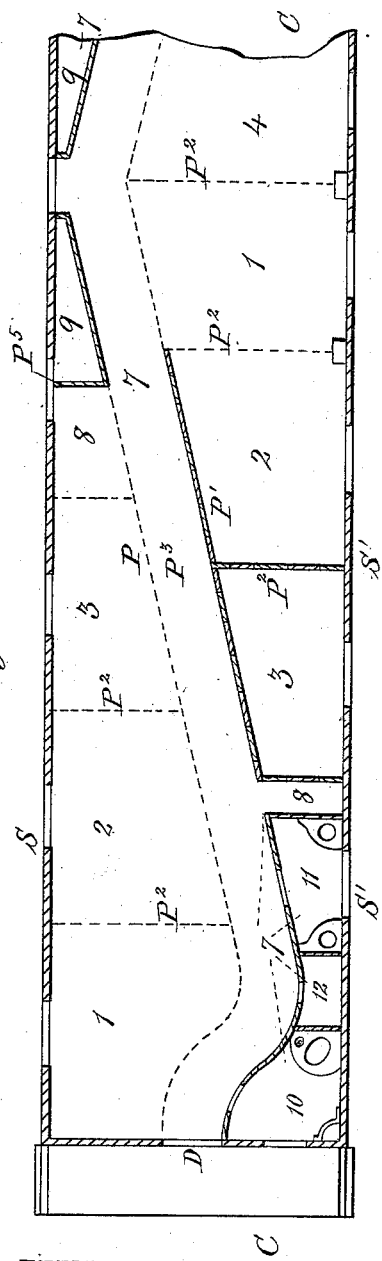
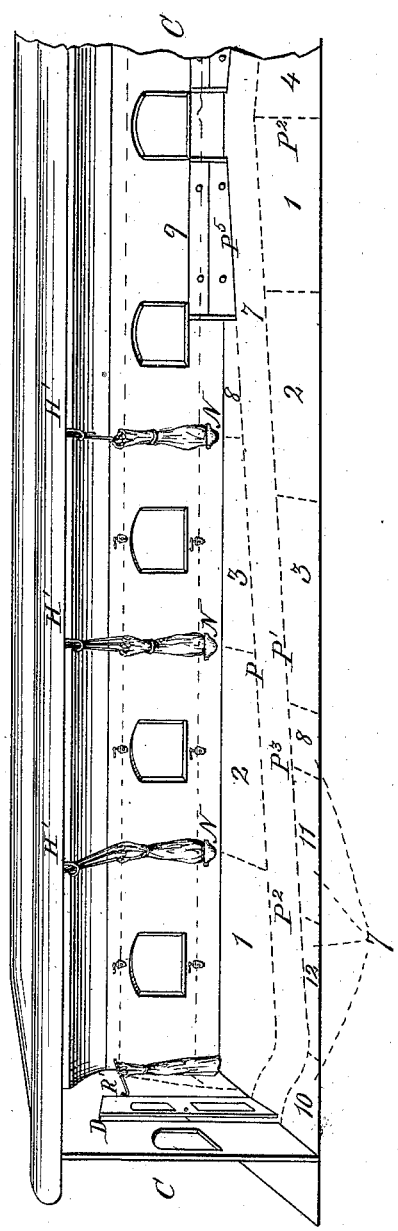
WITNESSES
INVENTOR
Henri Guillaume

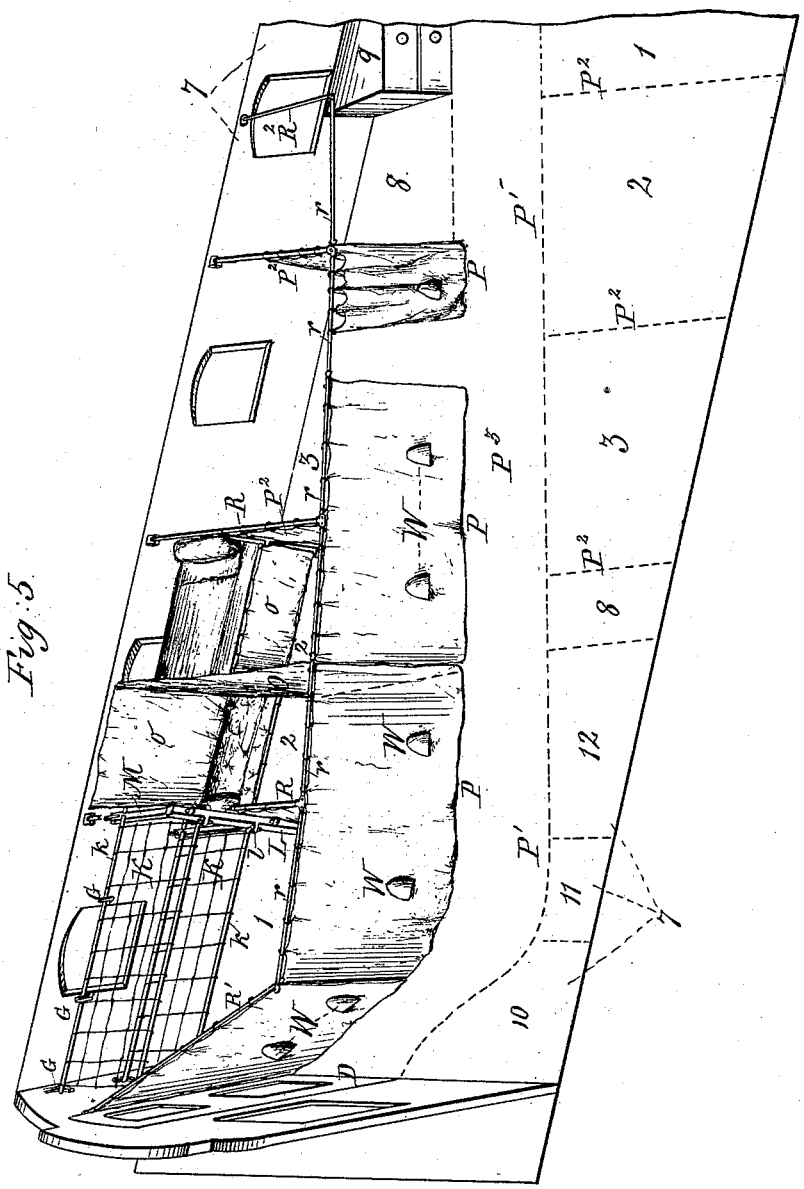

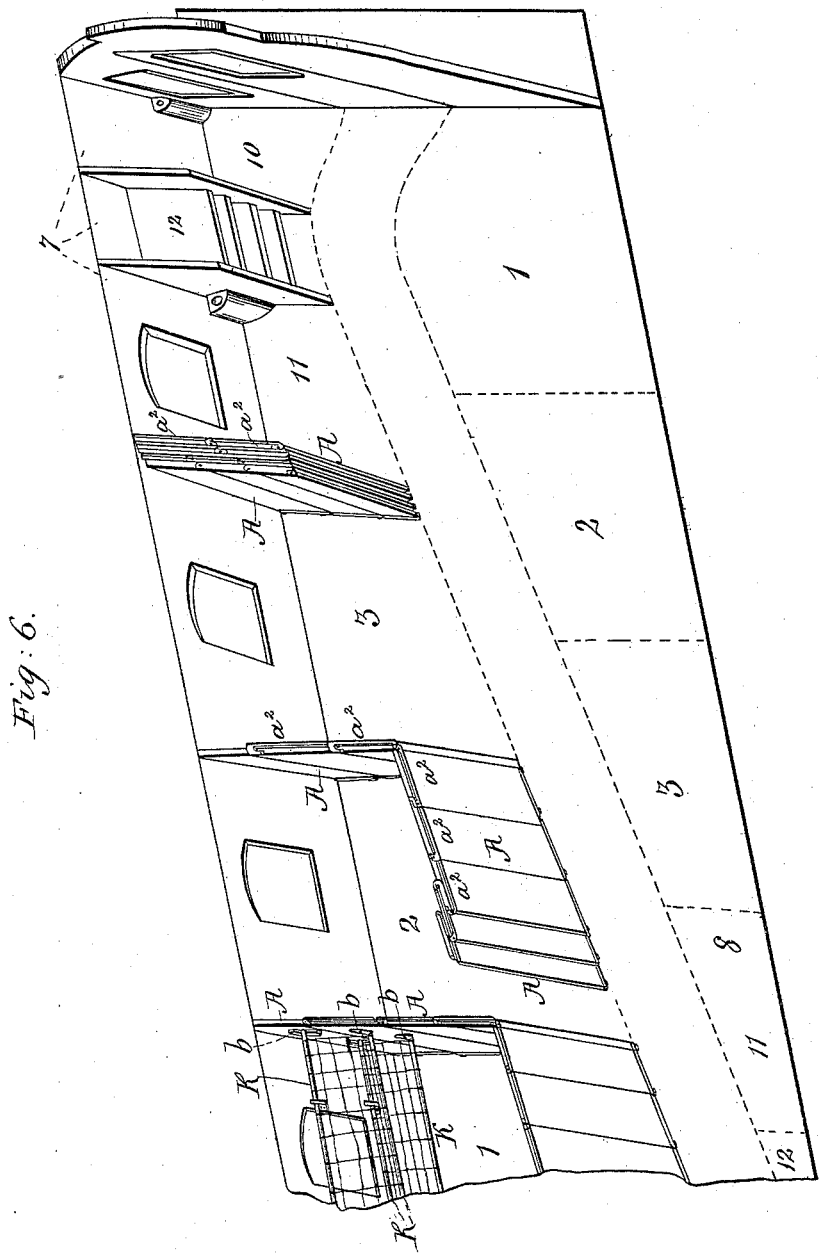

(No Model.) 8 Sheets—Sheet 5.
H. GUILLAUME.
SLEEPING CAR.
No. 331,233. Patented Nov. 24, 1885.
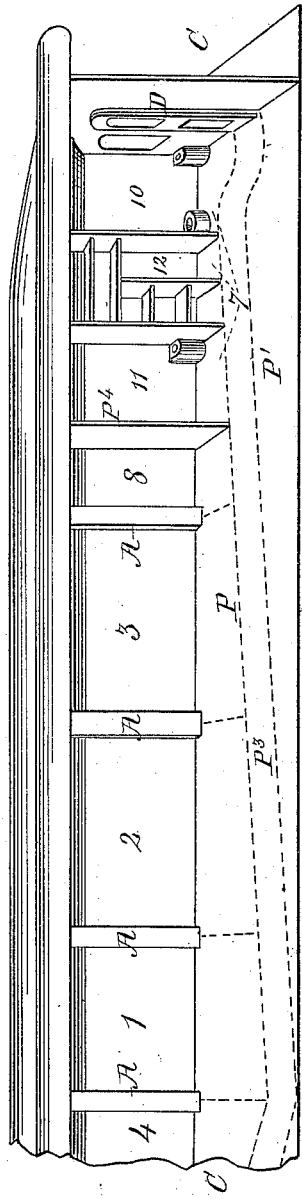
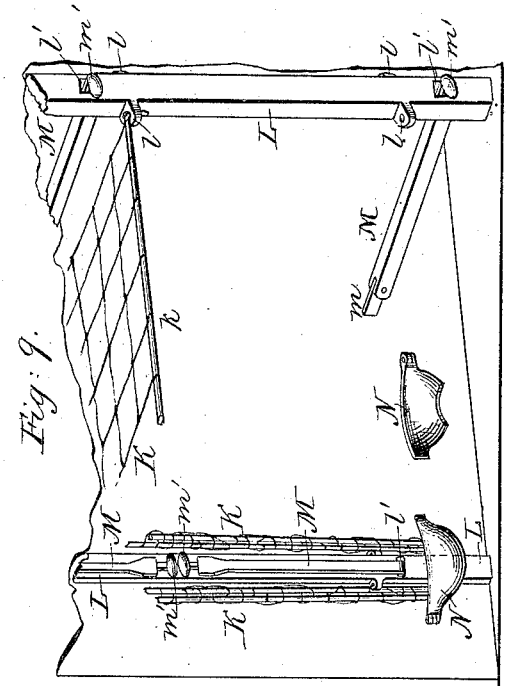
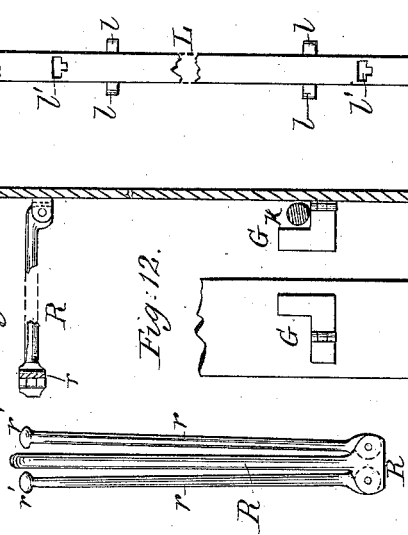
WITNESSES
INVENTOR
Henri Guillaume

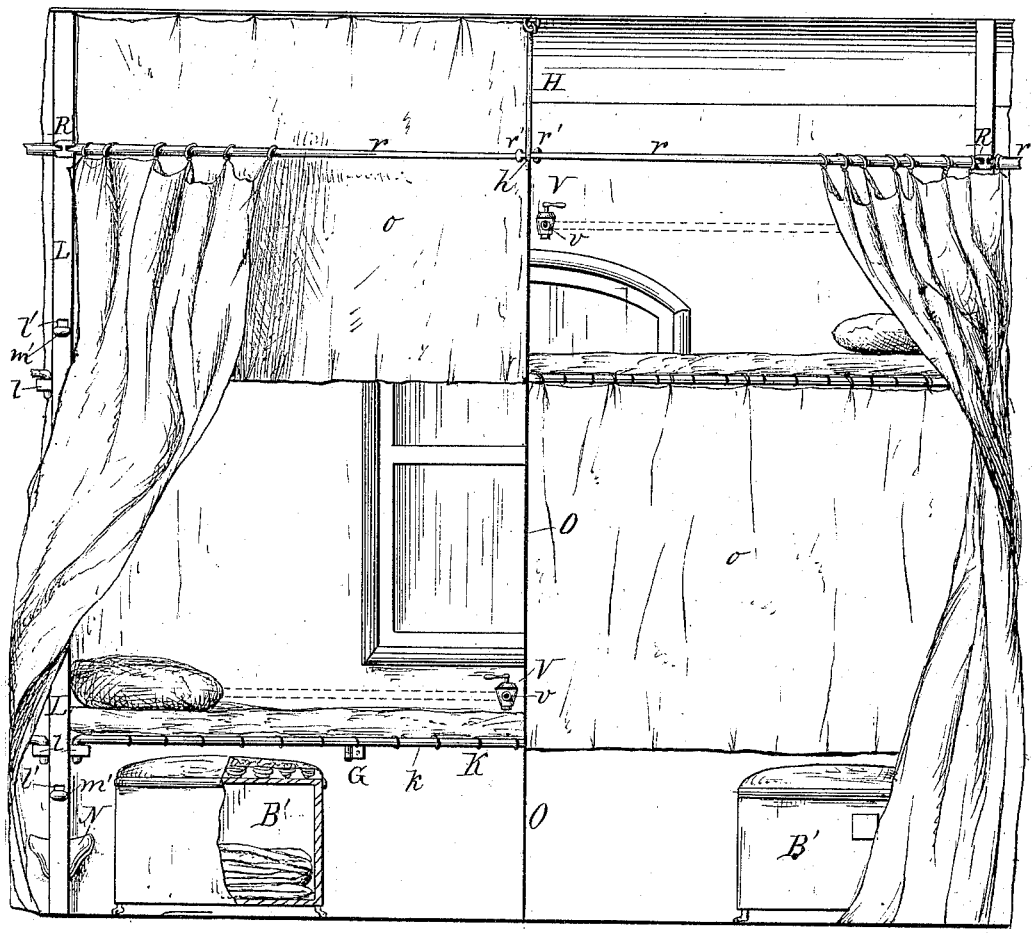

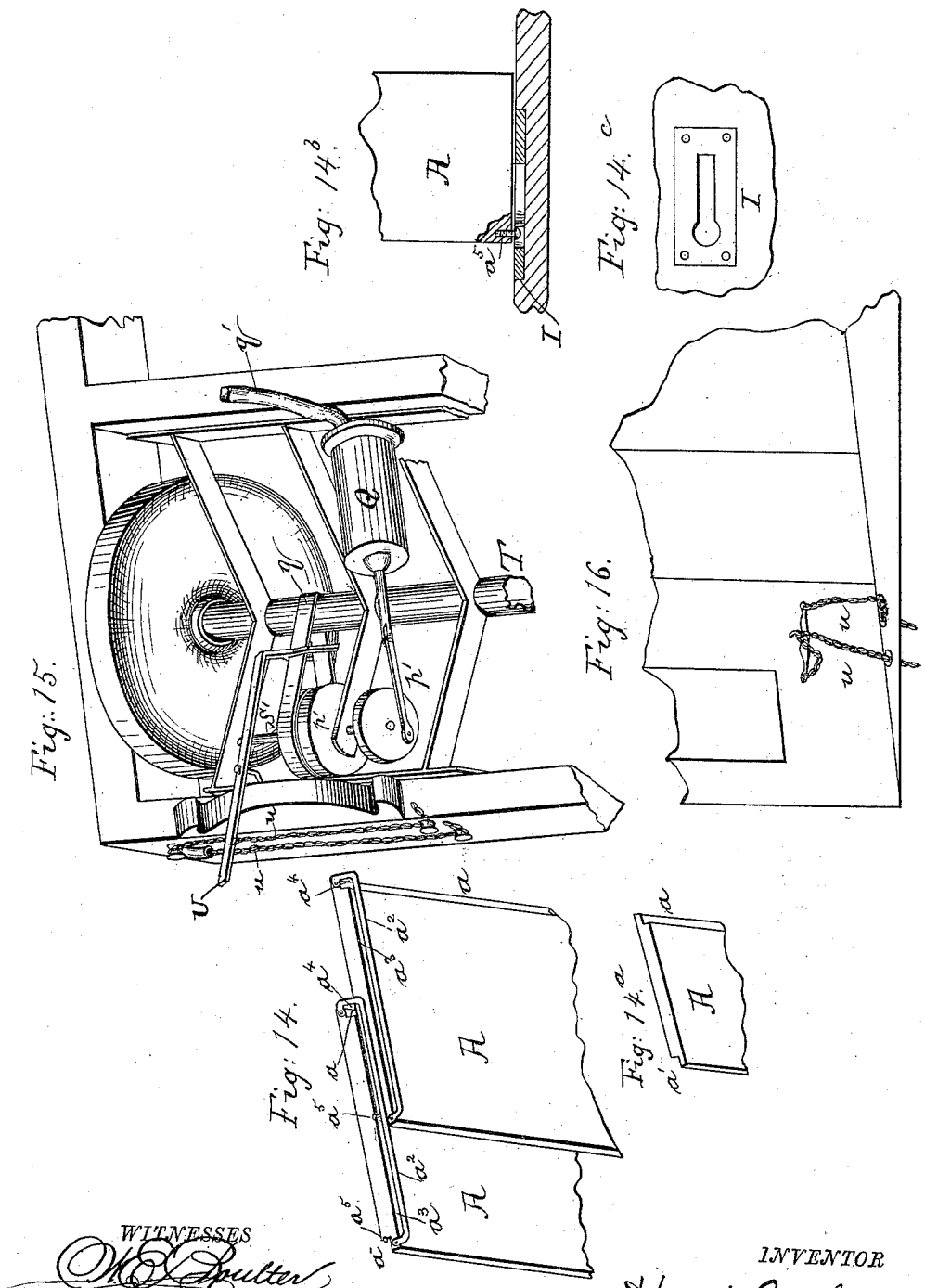

(No Model.)  
8 Sheets—Sheet 8.
H. GUILLAUME.
SLEEPING CAR.
No. 331,233.  
Patented Nov. 24, 1885.
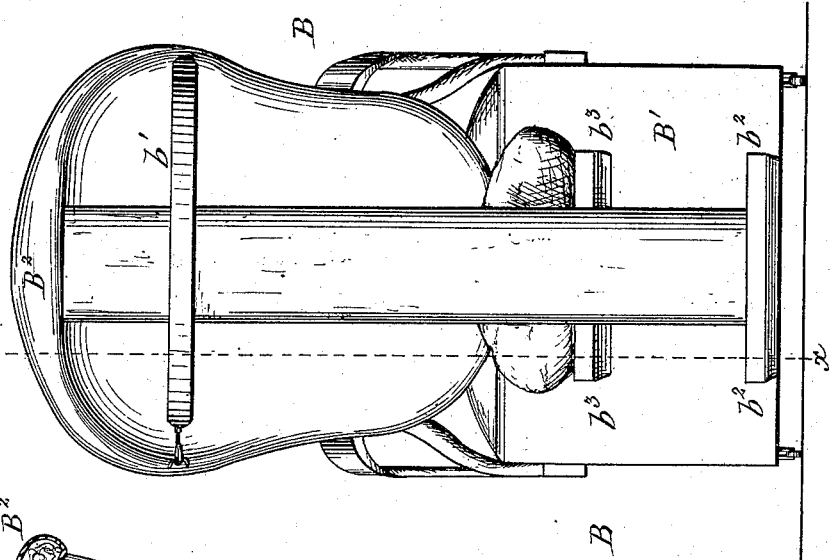
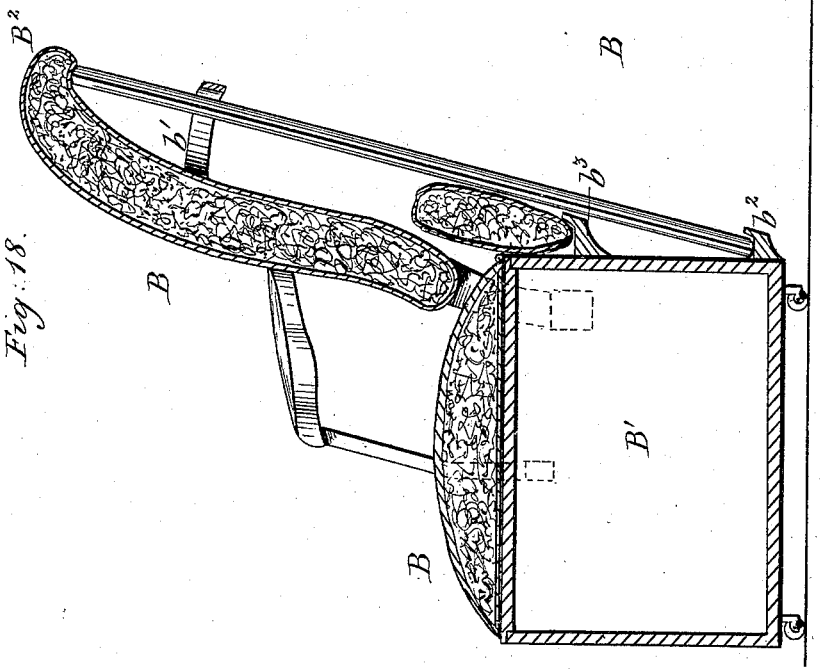
WITNESSES  
INVENTOR  
Henri Guillaume

UNITED STATES PATENT OFFICE.

HENRI GUILLAUME, OF WASHINGTON, DISTRICT OF COLUMBIA.

SLEEPING-CAR.

SPECIFICATION forming part of Letters Patent No. 331,233, dated November 24, 1885.

Application filed June 23, 1885. Serial No. 169,525. (No model.)

*To all whom it may concern:*

Be it known that I, HENRI GUILLAUME, a citizen of the United States, residing at Washington, in the District of Columbia, have invented certain new and useful Improvements in Railway-Cars; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of railroad-cars which are constructed and provided with the necessary means and appurtenances for converting the same from a saloon passenger-car into a sleeping-car, and vice versa.

Cars of the class referred to as heretofore constructed for conversion and subdivision into a sleeper are usually provided with twenty-four berths, the necessary wash-room, closets, storage facilities for the bed-linen and bedding either in separate lockers or within the seats where such are convertible into berths. In the subdivision of these cars, either by means of curtains or foldable slatted partitions, no space is afforded to the occupants of the berths to undress, compelling them to do this in the berth itself, which is not only a great annoyance, but extremely inconvenient, and if a passenger desires to be in the least comfortable he is subjected to the expense of engaging an entire section, so as to have at least the space which would have otherwise been occupied by a berth either above or below the one intended for occupation by said passenger to his exclusive use. The berths in these cars are screened from view or separated from the central aisle or passage through the car by a simple curtain, adapted to be drawn in front of each berth the full length thereof, or by means of foldable or slatted partitions, adapted to be drawn in front of the berths so as to isolate each one of them from the others.

One of the objects of my invention is to provide means whereby a car of the class described may be so subdivided in its conversion from a saloon car into a sleeper, and without thereby sacrificing its carrying capacity, as to afford each occupant of a berth ample space wherein he may comfortably change his dress before retiring without being compelled to do this in the berth itself, and to so arrange the subdivisions as to absolutely isolate the berths from one another.

Another great source of inconvenience to passengers occupying berths in sleepers, as now generally constructed and subdivided, is due to the excessively bad ventilation, the upper berths being almost untenantable in warm weather, without subjecting the occupant to strong drafts of air, and thereby endangering his health.

My invention has for its further object to provide means whereby a more thorough ventilation of all the berths may be effected without thereby subjecting the occupants to injurious drafts of air, and to effect this ventilation by mechanical means operated from one of the car-axles.

To these ends the invention consists in the mode, substantially as hereinafter fully described, of subdividing a railway passenger-car, for converting the same into a sleeper, by forming the main or longitudinal subdivision on diagonal lines, whereby a series of geometrical figures of triangular form are obtained.

It further consists in the mode, substantially as hereinafter fully described, of subdividing a railway passenger-car, for converting the same into a sleeper, by forming the main or longitudinal subdivisions on diagonal lines extending from the ends to the center of the car, whereby a series of geometrical figures of triangular form are obtained.

It also consists in the mode, substantially as hereinafter fully described, of subdividing a railway passenger-car, for converting the same into a sleeper, by forming the main or longitudinal divisions on diagonal lines to produce a series of geometrical figures of triangular shape, and subdividing these triangles on lines at right angles to the longitudinal axis of the car into sections or compartments for the reception of berths and other purposes; also, in the mode, substantially as hereinafter fully described, of subdividing a railway passenger-car, for converting the same into a sleeper, by dividing it into a series of triangular compartments, subdividing these into sections for the reception of berths and other purposes, and subdividing the berth-sections, or some of them, by an intermediate partition;

also, in the mode, substantially as hereinafter fully described, of subdividing a railway passenger-car, for converting the same into a sleeper, and forming a compartment or space for each berth, and isolating the berths from one another, which consists in dividing the car into triangular compartments, subdividing these compartments into sections for the reception of berths and other purposes, dividing the berth-sections, or some of them, by a central partition extending from the berth to the main division-line, and inclosing one end of one berth on one side of said central partition, and the opposite end of the other berth on the opposite side of said partition; and, lastly, the invention consists in the means whereby the above-recited modes are carried into practical effect, and in the construction, combination, and co-operation of the various parts that constitute my invention, substantially as hereinafter fully set forth.

In the accompanying drawings, Figure 1 is a diagrammatical view of a railroad-car, illustrating one mode of subdividing the same for conversion into a sleeper. Fig. 2 is a like view of a railroad-car, illustrating another mode of subdividing the same, for the purposes set forth. Fig. 3 is a horizontal sectional view of a portion of a railroad-car on a larger scale, showing the mode of subdivision illustrated in Fig. 2. Fig. 4 is a sectional elevation of a portion of a railroad-car, illustrating one mode of folding back the partitions of the berth-sections. Fig. 5 is a like isometrical view, showing some of the sections partitioned off, also showing the mode of arranging the air-ports in the partitions. Fig. 6 illustrates, by a like isometrical view, a portion of a railroad-car, illustrating the mode of partitioning the same by means of slotted folding partitions. Fig. 7 is a similar view, illustrating the slatted partitions folded back against the side of the car. Fig. 8 is a detail view, on an enlarged scale, showing the mode of isolating the berths from one another, and for producing an air-current at each of the berths. Figs. 9, 10, 11, 12, 13, $14^a$, $14^b$, and $14^c$ are detached views illustrating the mode of arranging the berths and of folding the parts against the side of the car when not in use. Fig. 14 is a detached isometrical view of a portion of a slat partition, showing its construction and mode of folding. Figs. 15, 16 are detail isometrical views of the arrangement of air-pump and the means of throwing the same into or out of operation. Fig. 17 is a rear elevation of one of the arm-chairs, illustrating the mode of storing the mattress and pillow and bedding; and Fig. 18 is a section thereof, taken on the line $x$ $x$ of Fig. 17.

One of the objects of this invention is to subdivide a railroad-car, for conversion into a sleeper, in such a manner as to provide a separate compartment in front of or adjacent to each individual berth, whereby sufficient room is afforded for the occupant of each berth to comfortably dress or undress without sacrificing the carrying capacity of the car. This cannot be effected by the ordinary mode of subdivision into polygonal sections by longitudinal and transverse partitions. To obtain this desired result, I subdivide the car on longitudinal diagonal lines extending either from end to end of the car, as shown in Fig. 1, or on such lines extending from the ends of the car to the center thereof, as shown in Fig. 2, and by transverse partitions on lines at right angles to the side of the car. In this manner I obtain, as in Fig. 1, a longitudinal passageway, $P^3$, that extends from the door D at one end of the car toward one side, S, thereof, and thence diagonally to the other end and side, S', and at right angles to the door D' at said end of the car C. The triangular or wedge-shaped spaces thus obtained by the main partitions P P', I subdivide, by means of transverse partitions $P^2$, into a series of compartments. In cars of the usual dimensions I obtain in this manner seven compartments, 1 2 3 4 5 6 7, on each side of the car. Six of these—namely, those 1 2 3 4 5 6—will be of such a length as to accommodate a berth of the usual length. Consequently each section will accommodate two berths arranged as usual one above the other, or twenty-four passengers to each car, which is the usual carrying capacity. It will, however, be observed that the width of the compartments is much greater than that in ordinary sleepers, where such width does never exceed that of the berth, providing, therefore, a considerable space in front of the berths for the use of the occupants. As will be seen, the diameter of the sections gradually decreases from section 1 to section 7, the latter being an acute triangle, and to afford room for both occupants of the last berth, section 6, I divide off a portion of section 7 to form a sort of anteroom, 8, for either the upper or lower berth, thus providing for each section ample space in front thereof or adjacent thereto for its occupants, and by a further subdivision of the spaces in front of the berths, and by isolating the berths from one another, as hereinafter described, each occupant will have at his exclusive disposal a space in front of or adjacent to his berth that will answer the purposes of an ordinary sleeping-chamber and accommodate a stool, as hereinafter described, and leave sufficient standing-room. The section 7 will be formed of a permanent partition, and it will be found sufficiently ample for the application of closets, toilet appliances, and even a locker for the bed clothing or linen or toilet-linen.

The described mode of subdivision is a very convenient one, and illustrates clearly the mode of carrying out my invention. Further, I am enabled to effect a material gain in space by the mode of subdivision on diagonal and transverse lines shown in Fig. 2, whereby I obtain the same number of berth-sections, which, however, will have a greater transverse sectional area than the berth-section obtained by the mode of subdivision described in reference to and shown in Fig. 1.

In the mode of subdivision illustrated in Fig. 2 the diagonal main or longitudinal partitions P P', that form the aisle or passage P³, extend from the door D, at one end of the car C, toward the side S thereof, thence diagonally to the side S', terminating midway of the car, as shown, and thence extending toward the opposite end and side, S, and back to the door D' of the car. In this subdivision I also obtain a series of triangular or wedge-shaped compartments—namely, two on one side of the car, as, for instance, at the side S', and one at the opposite side, S, or vice versa. By subdividing these compartments by means of transverse partitions P², I also obtain twelve berth-sections, of which six will be on one side and six on the other side of the car. The sections 1 2 3 and 4 5 6 on one side of the car will decrease in transverse sectional area toward the center in the order named, while on the opposite side the corresponding sections will decrease in cross-sectional area in reverse directions, or from the center toward the opposite ends of the car C. In this mode of subdivision I obtain four compartments or sections 7, instead of the two obtained by the mode of subdivision described in reference to Fig. 1, which sections 7 are also partitioned off to form anterooms or compartments 8 for one of the berths of the narrower end section 3 and 6, on the opposite sides of the car. The partitions P⁴, forming one end wall of said anteroom or compartment 8, and a portion of the main longitudinal portion extending from partition P⁴ to the center of the car on one side, S', thereof, as at P⁵, I preferably make permanent, thus forming lockers 9 9 on that side, as more plainly shown in Figs. 3, 4, and 5. On the opposite side, S, of the car the corresponding partitions, P⁴, of the end section 3 and 6, and that portion of the main partition P' that extends from partition P⁴ to the doors D D', is also made permanent and a compartment obtained of sufficient area for partitioning into three compartments, of which that 10, for instance, may serve as a water-closet, that 11 as a wash-room, and that 12 between the two as a locker for bed or toilet linen, as more plainly shown in Fig. 5.

Any suitable or well-known construction of folding partitions, either slatted or textile, (curtains,) may be employed for the temporary partitioning of the car into berth-sections, and for subdividing the latter section to form a chamber for each of said sections. In the accompanying drawings I have shown means which will not only be found very simple and comparatively inexpensive in construction, but also of such a nature as to be readily brought into position for use, and as readily compacted or folded out of the way, and these means constitute a part of this invention.

Referring more particularly to Figs. 4 to 13, inclusive, I would state that the partitions may be formed of textile material, or partly of such material and of slat-work, or of slat-work exclusively.

I will first describe the means for partitioning a car, as described, by means of slatted folding partitions, referring to Figs. 6, 7, and 14. The partitions are formed of slats A, the vertical edges of which are recessed on opposite sides of the slats, as shown at $a\ a'$. To the upper end of each slat is secured a guide rail or rod, $a^2$, so as to form a slot, $a^3$, extending the full length of said upper edge, with a re-entering notch or portion, $a^4$, corresponding with the recessed or chamfered portion $a$ of the slat, all of said slats being constructed and arranged as described, the re-entering notch or portion $a^4$ of slot $a^3$ being on all the slats at the same edge, $a$. At the opposite end of the slot $a^3$ is a pin, $a^5$, that projects from the upper face of each slat, and in folding or unfolding, the pin is guided by the rod or rail $a^2$ in the slot $a^3$ formed thereby, and by the horizontal upper edge of the slat.

It is obvious that when the slats are in the position shown in Fig. 14, half extended or unfolded, by pulling the projecting slat out until the pin or stud $a^5$ enters into the re-entering portion $a^4$ of slot $a^3$, the chamfered edges $a'$ of one slat will come to lie in the corresponding edge, $a$, of the slat moved outwardly, the depth of the chamfer or recess being such that the surface of the slats will be flush and form a partition with an unbroken surface.

To fold the slats on top of one another, they are moved to bring the pins or studs $a^5$ into slot $a^3$, and simply pushed toward one another until the said pin has reached the end of slot $a^3$ opposite to that where the re-entering portion $a^4$ is formed, and the slats will lie on top of one another, as shown in Fig. 6, where the slatted partitions are shown extended and partially folded. These partitions are so arranged as to adapt them for extension to the required distance from the side of the car, and thence along the diagonal main line P or P' to the transverse portion of the partition of the adjoining section, each partition thus forming two sides of a berth-section. Other arrangements may, however, be made—as, for instance, to adapt the partitions to be extended at right angles or on diagonal lines in opposite directions from the transverse portion of the partition, thus forming T-shaped partitions, the leg or web of the T constituting the partition-wall between two sections, while the cross portion constitutes one-half of the front wall of two adjacent berth-sections. The end section of each partition is pivoted to the side of the car, so that when folded it may be swung on its pivots to lie flat against said side of the car, as shown in Fig. 7. Any suitable means may be employed to secure the partitions into position. They may be detachably connected with the berth-supports on the one hand, and with the floor of the car on the other hand, by means of hooks and staples, or by other equivalent means.

In Fig. 6 I have shown the end slats provided with bearings $b$, from which the bed-supports K are supported, thereby steadying the end slat or slats of the partitions, and, if desired, the described floor-fastenings may be dispensed with, as the slats are each provided with a guide-rod, $a^2$, and guide-pins $a^5$ at opposite ends; or said guide-pins at the floor end of the slats may be made to engage button-hole irons I, secured to the floor of the car C, a headed pin, $a^5$, being employed for this purpose, as shown in Figs. $14^b$ and $14^c$.

It will readily be understood that by the means described the partitioning of the car may be effected in a simple, effective, and rapid manner, and the partitions folded out of the way against the sides of the car in a compact form.

Instead of using partitions composed of foldable wooden slats, any suitable fabric may be employed, preferably a fabric of sufficient weight to hang properly when unfolded.

The use of a fabric involves, naturally, slight modifications in the arrangement of the devices for unfolding the partitions, and these devices I will now describe, together with the means employed for securing the bed-supports and the mode of storing the same, as well as the bedding, referring to Figs. 4, 5, 8, 9, 10, 11, 12, and 13. To the sides of the car at each transverse division-line, and at a point sufficiently elevated to shield from view the upper berths when the partitions are unfolded, is pivoted an arm or rod, R, which is free to swing upwardly, but the downward movement of which is limited to hold the same in a horizontal position. To the outer end of the rod R are pivoted two arms, $r$ $r$, arranged to swing outwardly at right angles, or at angles less than right-angles to rod R, and form a T-support, which is shown folded in Fig. 13 and extended in Fig. 11. On the rod R are looped the curtains E, that form the transverse partitions $P^2$, while to the arms $r$ of the rod are looped curtains, each of which incloses one-half of the front of the berth-sections, and when in position form the main diagonal partitions P P', on the opposite sides of the passage or aisle $P^3$, except at the end sections 1 and 3. At the said sections one of the arms of the rod R is connected to a rod, R', that extends from said arm $r$ to one side of the door D or D', as the case may be, while the arm $r$ of the rod at section 3 is connected with a rod, $R^2$, devoid of lateral arms $r$, as shown in Fig. 5. The ends of the arms $r$ are provided with eyes and hooks or other suitable means for hooking or otherwise connecting the same together when extended to support the curtains.

In Figs. 8 and 13 I have shown the arms $r$ of rod R as terminating in a button, $r'$, that when extended lie in a hook, $h$, of hangers H, secured to and depending from the roof of the car, for supporting the arms $r$ of rods R at their point of junction, as more plainly shown in Fig. 8.

When not in use, the rods R are swung upward toward the roof of the car, and held in that position by being placed in the hook at the end of the hangers H', the rods R' being arranged to swing back and lie against the end of the car, as shown in Fig. 4, while the rods $R^2$ are swung against the side of the car. It will thus be seen that the partitioning of the car into a sleeper may be effected with rapidity, and the partitions likewise removed. In the latter operation it is simply necessary to lift the ends of the arms $r$ out of the hooks, and fold them against the rod R, and when the latter is raised and placed into the hangers H' the curtains will of their own weight move down the rod and its arms to the pivoted end of rod R, and hang from that end at the side of the car, as shown in Fig. 4. In this manner I am also enabled to disguise or cover some of the berth-furniture, as will be presently explained.

To the side of the car and in proper position are secured hooks G, which are hinged to their supporting-plates so as to fold back flat against said side of the car, as shown in Figs. 5, 11, and 12. These hooks support one of the side bars $k$ of the bed-supports K, the other being supported from a standard, L, that has laterally-projecting perforated lugs or ears $l$, to which said other side bar of the bed-support is hooked. The upright or standard L has T-shaped slots $l'$, and is held in proper position by brace-rods M, Figs. 5 and 9, that are hinged to flat lugs $m$, projecting from the side of the car on the line of transverse division. At the end of the brace-rods M is secured a headed bolt or pin, $m'$, adapted to pass through the horizontal portion of the T-slot $l'$ of the upright L, and held securely in the leg or vertical portions of said slot.

By means of the described arrangement for supporting the bed-supports it will be seen that a continuous connection is formed between the berths through the standards or uprights L, the effect being the same as if the bed-supports were rigidly connected to one another. When it is desired to remove the berths, the bed-supports are detached or unhooked and rolled up. The bolt $m'$ of the braces M is then withdrawn from the vertical portion of the slot $l$ of upright L, and these are then pushed back over the braces at the side of the car. When fully pushed back, the upper brace-rod will swing down, while the lower brace-rod may be swung up so as to lie against the front face of the upright L. The folded bed-supports are then placed on each side of the folded braces and uprights and secured in position. This is effected by means of a cup-shaped latch, N, hinged to the side of the car, and fitting over the uprights L, into which cup-shaped latch the bed-supports K are stuck when folded, the whole being further secured and held by the curtains, which are tied over the parts, the ends of the curtains being stuck into the latch N, as shown in Fig. 4, thus completely hiding from view the bed-supports and the berth-framing.

Instead of the usual mattress employed in sleeping-cars, I prefer to employ an inflatable rubber mattress, so as to adapt it to be compactly folded, and I preferably store the same, as well as the pillow, behind the chairs B, the backs and arms of which are detachably connected with the seat B', which is made in the form of a box wherein to store bed linen or blankets or other articles. To the back of the chair is secured a strap, $b'$, and to the rear of the seat two brackets, $b^2 b^3$. From the bracket $b^3$ is supported the pillow, and from the bracket $b^2$ the inflatable mattress, which is held at its upper end by the strap $b'$, and abuts against the back of the chair, which is for this purpose curved backward, as shown at $B^2$, Figs. 17 and 18.

When the car is converted into a sleeper, the pillow and mattress are removed, as well as the back and arms of the chair, which latter may be stowed away under the lower berth, a stool being thus provided for the occupant of the berth.

I have hereinbefore stated that the berths are isolated from one another, and that a space is provided for the occupant of each berth, either in front thereof or adjacent thereto. I have above described how that space is obtained for the upper berth of section 3, which space 8 is at the end of the section, while the space for the lower berth of section 3 is in front thereof, the upper berth being in this case closed to the occupant of the lower berth by a curtain drawn in front thereof. The remaining sections are divided by means of an intermediate partition or curtain, O, extending from the berths to the main partition P or P', as the case may be, the foot end of each berth being closed by a curtain, $o$, as shown in Figs. 5 and 8. It will be seen that by closing one end of one of the berths on one side of the curtain, and the opposite end of the other berth on the other side of the curtain O, the occupant of one berth will be entirely isolated from the occupant of the other berth, as plainly shown in Figs. 5 and 8.

In order to make the berths more comfortable than is the case in sleepers as now arranged, which are very defective in ventilation, I employ means for forcing air to each individual berth and for creating a circulation through the berth-sections.

Any suitable forcing apparatus—such as a blower or pump—may be employed to force air into the car, and such blower or pump may be located in the car itself or underneath the same, and operated from one of the wheel axles.

In Figs. 15 and 16 I have shown an air-pump, Q, located underneath the car and operated from the wheel-axle T by means of a belt, $q$, connecting said axle with a pulley, $p$, or a crank-shaft, S', to which the pitman or connecting rod $p'$, that operates the piston of the pump, is connected. A suitable belt-shifting lever, U, arranged to be operated from the car by means of chains $u u$, is provided to shift the belt $q$ from the fast pulley $p$ to the loose pulley $p^2$, when it is desired to stop the operation of the pump. The air is forced through a rubber or other flexible pipe, $q'$, into pipes arranged along or between the walls of the car, and extend along the berths, where branches extend from the line-pipes along or through the said walls of the car, said branches $v$ being provided with stop-cocks V, so that the occupant of the berth may regulate the volume of air delivered from the branch $v$. The curtains along the principal or main division-lines P P' are provided with air holes or ports near the floor of the car, which air-ports are protected by a cap or shield, W, Fig. 5, of some stiff material, so that upward currents of air are induced through said ports, thus producing a circulation within the berth-sections. Instead of the pump Q, a blower may be mounted directly on the wheel-axle, and proper means provided for carrying the air through the pipes or for cutting it off therefrom.

I have stated above that rubber mattresses may be used, and these may be readily inflated by air taken from the line-pipe at any suitable point.

Having now described my invention, what I claim, and desire to secure by Letters Patent, is—

1. A railway passenger-car divided longitudinally by a diagonal partition, substantially as and for the purpose specified.

2. A railway passenger-car divided longitudinally by a diagonal partition extending from the ends of the car to the longitudinal center thereof, substantially as and for the purpose specified.

3. A railway passenger-car divided longitudinally by diagonal partitions into triangular sections, and a passage extending the full length of the car between said sections, substantially as and for the purpose specified.

4. A railway passenger-car divided longitudinally by diagonal partitions extending from the ends to the longitudinal center of the car into a series of triangular sections and a passage extending the full length of the car between said sections, substantially as and for the purpose specified.

5. A railway passenger-car divided longitudinally by a diagonal partition into triangular sections, in combination with transverse partitions for subdividing said triangular sections, substantially as and for the purpose specified.

6. A railway passenger-car divided longitudinally by diagonal partitions into triangular sections, and a passage extending the full length of the car between said sections, in combination with transverse partitions for subdividing said triangular sections, substantially as and for the purpose specified.

7. A railway passenger-car divided longitudinally by a foldable or removable diagonal partition, substantially as and for the purpose specified.

8. A railway passenger-car divided longitudinally by foldable or removable diagonal partitions into triangular sections, and a passage extending the full length of the car between said sections, substantially as and for the purpose specified.

9. A railway passenger-car divided longitudinally by a foldable or removable diagonal partition into triangular sections, in combination with foldable or removable transverse partitions for subdividing said sections, substantially as and for the purpose specified.

10. A railway passenger-car divided longitudinally by foldable or removable diagonal partitions into triangular sections, and a passage extending the full length of the car between said sections, in combination with foldable or removable transverse partitions for subdividing said triangular sections, substantially as and for the purpose specified.

11. A railway passenger-car divided longitudinally into triangular sections by a foldable or removable diagonal partition extending from the ends to the longitudinal center of the car, substantially as and for the purpose specified.

12. A railway passenger-car divided longitudinally into triangular sections, and a passage extending between said sections the full length of the car by foldable or removable diagonal partitions extending from the ends to the longitudinal center of the car, substantially as and for the purpose specified.

13. A railway passenger-car divided longitudinally into triangular sections by a foldable or removable diagonal partition extending from the ends to the longitudinal center of the car, in combination with foldable or removable transverse partitions for subdividing said sections, substantially as and for the purpose specified.

14. A railway passenger-car divided longitudinally by foldable or removable diagonal partitions extending from the ends to the lonitudinal center of the car into triangular sections, and a passage extending the full length of said car between said sections, in combination with foldable or removable transverse partitions to subdivide the triangular sections, substantially as and for the purpose specified.

15. The combination, with a railroad-car, of the rods R, having arms $r\ r$, to which curtains are looped, and the hangers H, substantially as and for the purposes specified.

16. The combination, with a railroad-car, of the rods R, having arms $r\ r$, to which curtains are looped, and the hangers H', substantially as and for the purposes specified.

17. The combination, with a railroad-car, of the berth-supports consisting of the swinging arms M, provided at their ends with a headed bolt or pin, $m'$, and the uprights L, having laterally-projecting perforated lugs or ears $l$ and T-slots $l'$, substantially as and for the purposes specified.

18. The combination, in a railroad-car, of foldable berths and bed-supports, with a bowl or cup shaped latch or retaining device, N, substantially as and for the purposes specified.

19. The combination, in a railroad-car, of foldable berths and bed-supports K L M, with the rods R, having foldable arms $r\ r$, from which the partition-curtains are supported, the hangers H', and the locking devices N, said parts being constructed and arranged for co-operation substantially as and for the purposes specified.

In testimony whereof I affix my signature in presence of two witnesses.

HENRI GUILLAUME.

Witnesses:
W. E. BOULTER,
PAUL M. KNOBLOCH.